(12) United States Patent
Dawson

(10) Patent No.: US 6,244,220 B1
(45) Date of Patent: Jun. 12, 2001

(54) PYRAMID CAGE

(76) Inventor: Robert W. Dawson, 717 Ultimo Ave., Long Beach, CA (US) 90804

( * ) Notice: Subject to any disclaimer, the term of this patent is extended or adjusted under 35 U.S.C. 154(b) by 0 days.

(21) Appl. No.: 09/317,504

(22) Filed: May 24, 1999

(51) Int. Cl.[7] .................................................. A01K 31/06
(52) U.S. Cl. ............................ 119/428; 119/463; 119/468
(58) Field of Search .................................... 119/428, 429, 119/430, 432, 434, 459, 463, 467, 468, 469, 470, 52.2, 57.8; D30/110, 111, 112, 124

(56) References Cited

U.S. PATENT DOCUMENTS

| | | | |
|---|---|---|---|
| Re. 16,681 | * | 7/1927 | Schleich . |
| D. 68,941 | * | 12/1925 | Schwartz . |
| D. 71,462 | * | 11/1926 | Kahn . |
| D. 245,927 | * | 9/1977 | Edward et al. ...................... D30/110 |
| D. 248,049 | * | 5/1978 | Pedigo ................................ D30/114 |
| D. 329,509 | * | 9/1992 | Burleigh .............................. D30/124 |
| D. 381,135 | * | 7/1997 | Hochlan, Jr. ........................ D30/124 |
| 809,559 | * | 1/1906 | Gault . |
| 1,123,044 | * | 12/1914 | Warnecke . |
| 1,203,865 | * | 11/1916 | Fair . |
| 2,725,851 | * | 12/1955 | Futterer . |
| 2,747,545 | * | 5/1956 | Baldwin . |
| 2,914,022 | * | 11/1959 | Hinton . |
| 3,029,788 | * | 4/1962 | Voss . |
| 3,211,130 | * | 10/1965 | Prince . |
| 3,730,139 | * | 5/1973 | Moore ................................... 119/429 |
| 5,076,213 | * | 12/1991 | Taylor .................................. 119/428 |
| 5,218,982 | * | 6/1993 | Kenji ...................................... 135/90 |
| 5,975,015 | * | 11/1999 | Runyon et al. ...................... 119/52.1 |

* cited by examiner

Primary Examiner—Charles T. Jordan
Assistant Examiner—Yvonne R Abbott
(74) Attorney, Agent, or Firm—Timothy Thut Tyson; Ted Masters; Freilich, Hornbaker & Rosen

(57) ABSTRACT

A bird cage (20) includes a centrally disposed bird receiving structure (30) and inwardly sloping sides (28) which in combination cause birds to face inward and thereby defecate away from the bird receiving structure. These features make the cleaning of the bird cage easier. In a preferred embodiment, the bird cage also includes a removable top portion (24) which is selectively connected to a bottom portion (22). Since the top portion can be removed from the bottom portion, cleaning of the bird cage is simplified. In a preferred embodiment, the bird cage does not include a conventional door.

4 Claims, 5 Drawing Sheets

PYRAMID CAGE

TECHNICAL FIELD

The present invention pertains generally to bird cages, and in particular to a bird cage which has a centrally disposed bird receiving structure and inwardly sloping sides.

BACKGROUND ART

Bird cages are well known in the art. They house one or more birds and contain a wide variety of perches, swings, and amenities such as seed trays, gravel trays, water trays, baths, toys, and the like. For example, U.S. Pat. No. 2,693,786 discloses a bird cage having a door hingedly mounted at its bottom so that it may optionally be caused to assume either a closed or horizontal open position. When the door is in a fully open horizontal position, it is self-supporting providing the bird inside a takeoff and landing platform. One important consideration in bird cage design is the ease with which the cage may be cleaned. For example, U.S. Pat. No. 4,572,107 shows an easily cleanable animal enclosure consisting of a cage detachably positioned over a funnel supported by a base member. Newspaper is placed within the funnel to absorb excreted matter that is discharged from the cage. A detachable sack having an inner bag is placed at the bottom open end of the funnel to catch any excreted matter that falls through. U.S. Pat. No. 4,838,204 illustrates an animal cage assembly comprising a cage supported by a base having two opposite inwardly and downwardly sloping baffles which are spaced apart from one another to form a gap therebetween positioned below the cage and a tray located below the gap. Two paper roll holders are mounted adjacent their respective sloping baffles for providing paper which can be pulled across the baffles to periodically replace the paper on the baffles. U.S. Pat. No. Des. 77,845 shows a substantially triangular bird cage in the top plan view. U.S. Pat. No. Des. 224,934 shows an animal shelter having a pyramid shape. U.S. Pat. No. Des. 248,049 illustrates a triangular bird cage. And, U.S. Patent Des. 376,874 illustrates a wire bird cage having four inwardly sloping sides.

DISCLOSURE OF INVENTION

The present invention is directed to an improved bird cage which is easy to clean because of its design. A vertically extending bird receiving structure, such as a tower, is centrally located in the cage and contains various amenities including perches mounted on the sides of the structure that attract birds and generally cause them to face inward toward the structure. Then when the birds defecate, they do not do so on the bird receiving structure. Additionally, the bird cage has upwardly and inwardly sloping sides or walls. The proximity of the sloping sides to the uppermost perches on the bird receiving structure further causes the birds to face inward rather than outward. Even if the birds turn on the perches placing their bodies parallel to a side of the bird receiving structure, the sloping sides of the cage extend away from the bottoms of the birds so that feces, which is discharged at a downward angle, tends to miss the sides. Rather than having a small conventional door, the bird cage has a removable top portion which can be selectively removed from a bottom portion thereby creating a large access to the bottom portion for cleaning. The removable top portion contains a removable perch which birds can occupy while the bottom portion is being cleaned.

In accordance with a preferred embodiment of the invention, the removal of the top portion from the bottom portion grants the birds temporary access to the outside while also allowing them to return for food or water.

In accordance with a preferred embodiment of the invention, the bird cage includes a base upon which the bird receiving structure is centrally disposed.

In accordance with an important aspect of the invention, the bird cage has a four sided pyramid, a three sided pyramid, or a cone shape.

In accordance with an important feature of the invention, the removable top portion is selectively connected to the bottom portion.

In accordance with another important aspect of the invention, the bird cage is doorless.

In accordance with another important aspect of the invention, the bird receiving structure further includes a plurality of centrally located vertically spaced amenities such as seed, water, gravel, toys, play area, bath, and the like.

Other features and advantages of the present invention will become apparent from the following detailed description, taken in conjunction with the accompanying drawings, which illustrate, by way of example, the principles of the invention.

MODES FOR CARRYING OUT THE INVENTION

Figure 1:
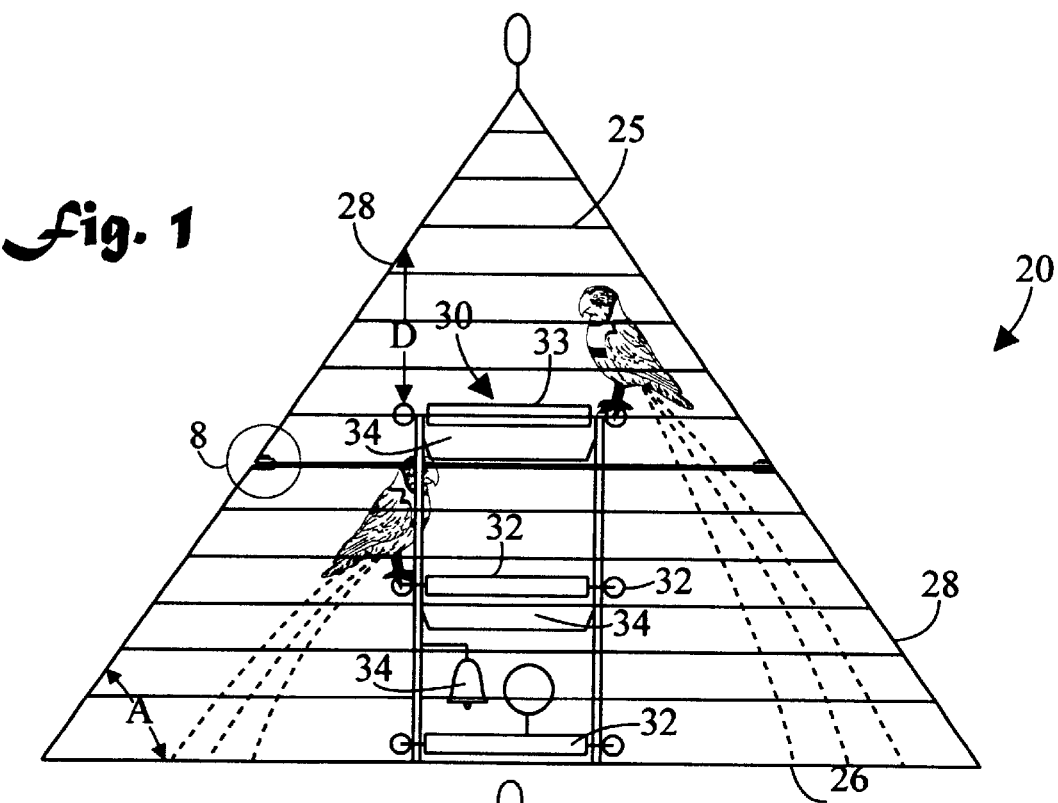
FIG. 1 is a side elevation view of a bird cage in accordance with the present invention.
Figure 2:
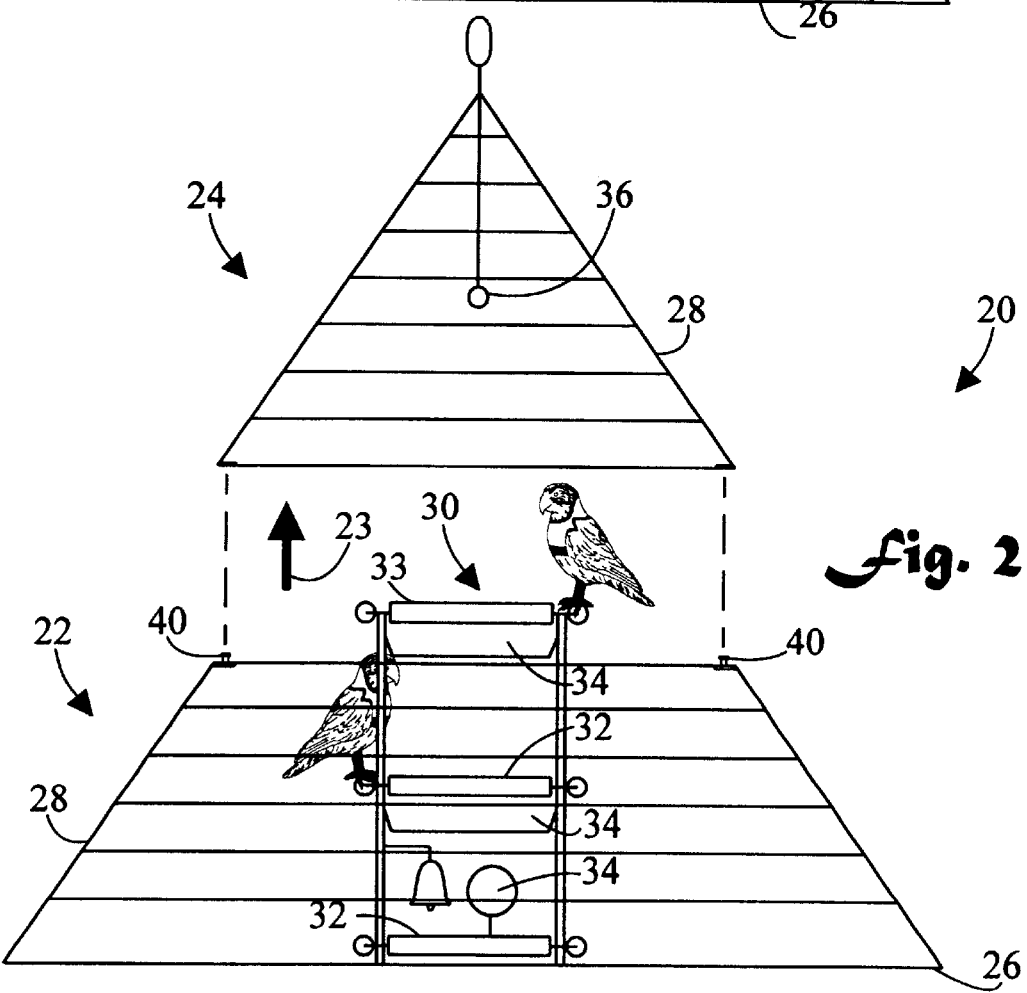
FIG. 2 is an exploded side elevation view of the bird cage showing a top portion removed from a bottom portion.
Figure 3:
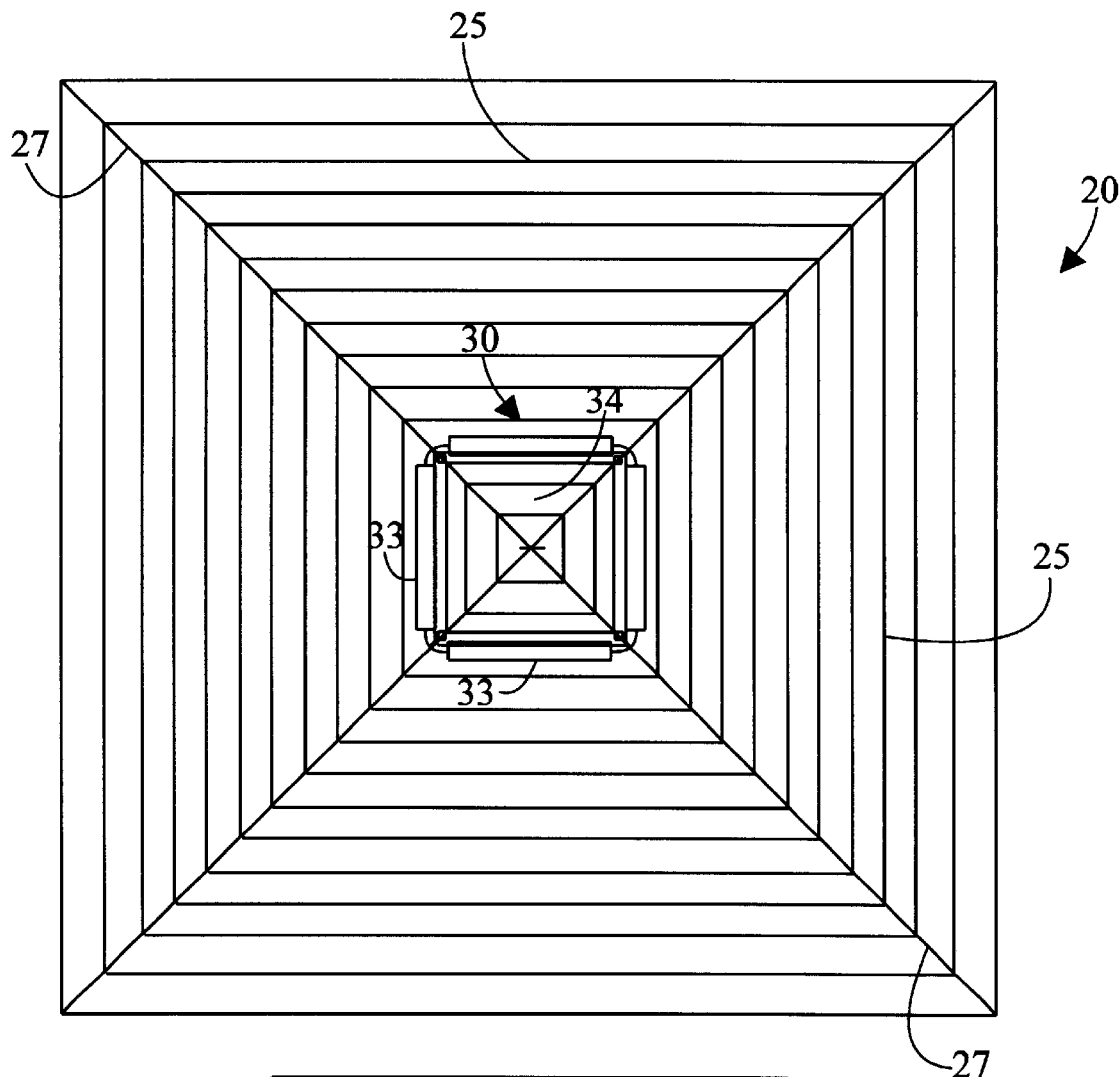
FIG. 3 is a top plan view of the bird cage.

Referring initially to FIGS. 1, 2, and 3, there are illustrated side elevation, exploded side elevation, and top plan views respectively of a bird cage in accordance with the present invention, generally designated as 20. Bird cage 20 includes a removable top portion 24 which is selectively connected to a bottom portion 22. Top portion 24 can be removed or detached from bottom portion 22 in upward direction 23 in order to clean the bird cage and/or allow the birds access to the outside. Bottom portion 22 of bird cage 20 has a base 26 having a perimeter. A plurality of inwardly sloping sides 28 are connected to the perimeter. In the shown preferred embodiment, base 26 is substantially square, and four inwardly sloping sides 28 are connected to base 26, thereby forming a substantially four sided pyramid. Other preferred embodiments include a triangular base and three inwardly sloping sides thereby forming a three sided pyramid, and a substantially circular base wherein the sides form a cone. Also in a preferred embodiment, the inwardly sloping sides 28 form an angle A of substantially between 40° and 70° with base 26.

A bird-receiving structure 30 is substantially centrally disposed upon base 26 (also refer to FIGS. 3 and 5) and is preferably secured to the base in order to keep it from moving about due to the activity of the birds. Bird-receiving structure 30 includes a plurality of vertically spaced perches 32 including an uppermost perch or perches 33. Bird receiving structure 30 also includes a plurality of centrally located vertically spaced amenities 34 such as water trays, seed trays, gravel trays, baths, toys, and play area. An important feature of the present invention resides in the fact that sloping side 28 is proximate to uppermost perch 33. This makes it more comfortable for a bird to face inward toward the amenities 34 than to face outward toward the immediately proximate side 28. By facing inward, the bird defecates outward and away from the central bird receiving structure 30, and only the floor of the bird cage 20 is dirtied, rather than the sides 28 of the cage or the structure 30 as shown in FIG. 1. Cleaning of the bird cage 20, and particularly bird-receiving structure 30, is therefore very much easier. The central placement of the amenities 34 also attracts birds perched on the lower perches 32 to face inward causing them to defecate outward as well. Even if the birds are provided with conventional perches coupled to the sides of the cage rather than bird-receiving structure 30, the feces is discharged downward at an angle and is less likely to hit the sides because the sides slope away from the birds than would be the case if the sides were vertical.

A selectively removable perch 36 is connected to removable top portion 24. Perch 36 is centrally located in cage 20 below the apex of the pyramid formed sides 28. A bird may reside on perch 36 when top portion 24 has been removed and bird cage 20 is being cleaned. It is noted that bird cage 20 is doorless. As defined herein, doorless means that bird cage 20 does not have a convention hinged member which can be selectively moved from a closed to an open position. In the present invention, access to the interior of bird cage 20 is achieved by removing top portion 24 from bottom portion 22. Also it is noted that bird cage 20 is comprised of a plurality of horizontal bars 25 connected to a plurality of upwardly angled support members 27.

Figure 4:
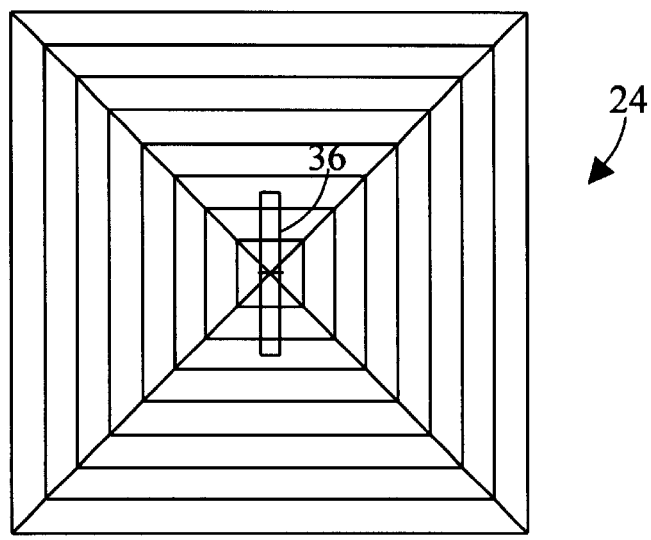
FIG. 4 is a top plan view of the top portion.

FIG. 4 is a top plan view of removable top portion 24 including selectively removable perch 36.

Figure 5:
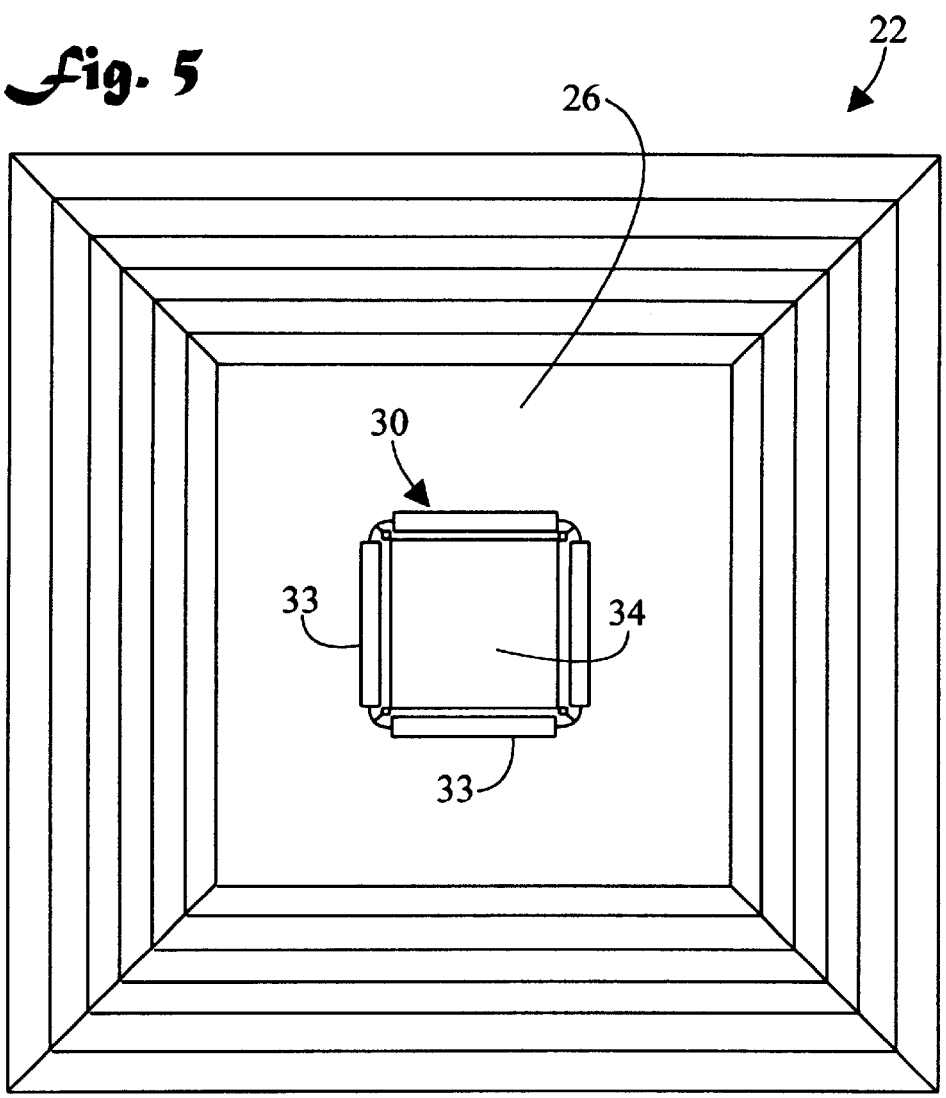
FIG. 5 is a top plan view of the bottom portion.

FIG. 5 is a top plan view of bottom portion 22 with top portion 24 removed showing the central disposition of bird receiving structure 30. Bird receiving structure 30 is preferably secured to base 26 so that it cannot move around. It is noted that with top portion 24 removed, the bottom portion is easy to clean through the large opening. The bird is also free to fly about a room and return to the bottom portion 22 as it desires.

Figure 6:
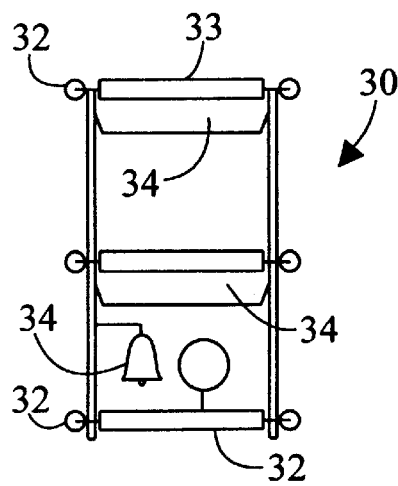
FIG. 6 is a side elevation view of a bird receiving structure.

FIG. 6 is a side elevation view of bird-receiving structure 30 showing perches 32, 33, and amenities 34.

Figure 7:
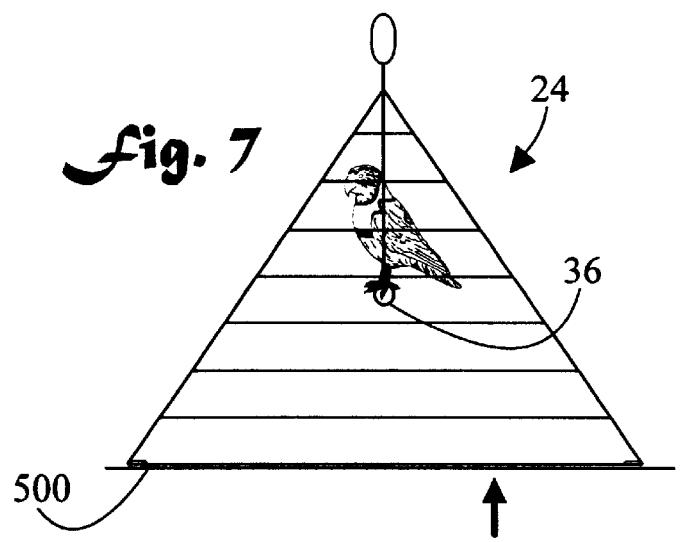
FIG. 7 is a side elevation view of the top portion with a bird sitting on a selectively removable perch.

FIG. 7 is a side elevation view of top portion 24 with a bird sitting on selectively removable perch 36. It is noted that a planar sheet 500, such as cardboard, can be temporarily placed beneath top portion 24 to contain the bird. Top portion 24 is thereby usable as a separate smaller cage. For example, when the bird owner wants to clean the bottom portion 22, he can entice the bird up onto the perch 36 in the top portion and put the top portion down separately on a table with the bird inside.

Figure 8:
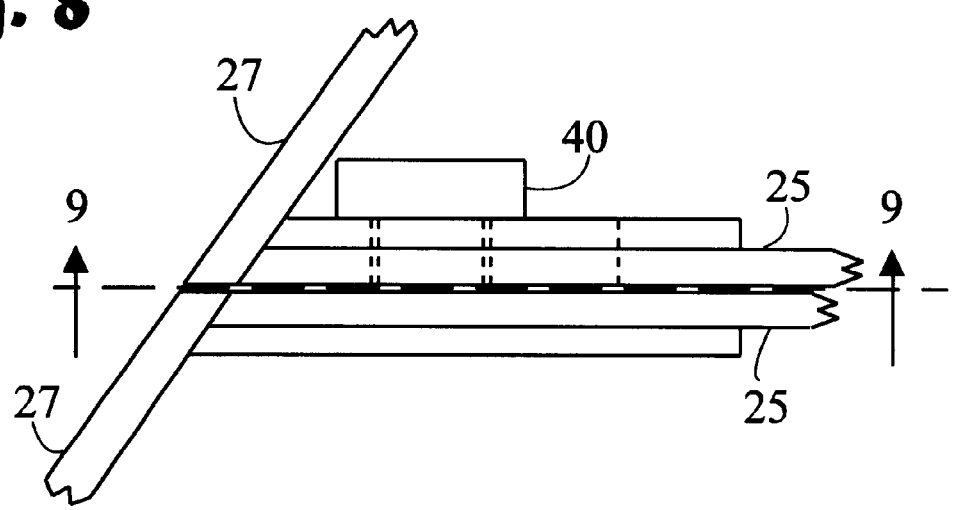
FIG. 8 is an enlarged view of area 8 of FIG. 1.
Figure 9:
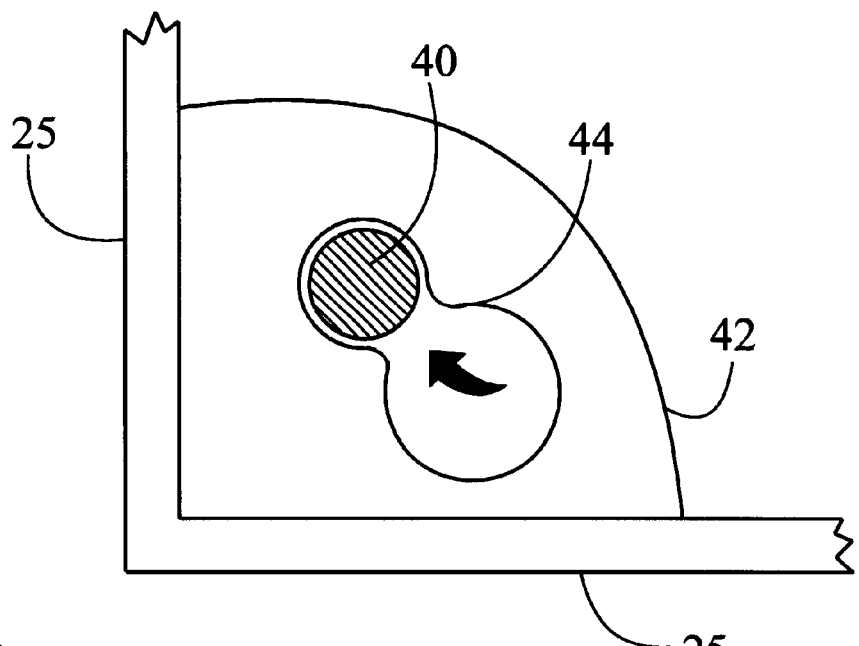
FIG. 9 is a view along the line 9—9 of FIG. 8.

FIG. 8 is an enlarged view of area 8 of FIG. 1, and FIG. 9 is a view along the line 9—9 of FIG. 8. These views show one possible way of selectively connecting top portion 24 and bottom portion 22. In the shown embodiment, head and neck members 40 are attached to lower portion 22 (also refer to FIG. 1), and cooperate with a plate 42 having a two-sized hole 44 which is connected to upper portion 24. Head and neck members 40 are inserted in the larger hole of two-sized holes 44 and then top portion 24 is rotated to lock top portion 24 and bottom portion 22 together. It may be appreciated that numerous other connection means could be utilized to removably attach top portion 24 to bottom portion 22.

Other overall cage configurations are also possible which are within the scope of this invention. For example, instead of coupling top portion 24 and bottom portion 22 together, an alternate bottom such as shown in FIG. 7 can be coupled directly to top portion 24. However, instead of being fabricate of temporary cardboard, it is a solid metal sheet or wire grid similar to sides 28 with head and neck members 40 attached to the corners. A modular system can also be created permitting the assembly of cages to match bird size. A bottom portion such as bottom portion 22 but without a base 26 is attached to top portion 24. One or more additional bottom portions extending the sloping sides 28 further outward are then added below using the head and neck members 40 between each until the desired size of cage is reached. A base similar to base 26 but larger is then attached to the bottom using head and neck members 40 to complete the cage.

Figure 10:
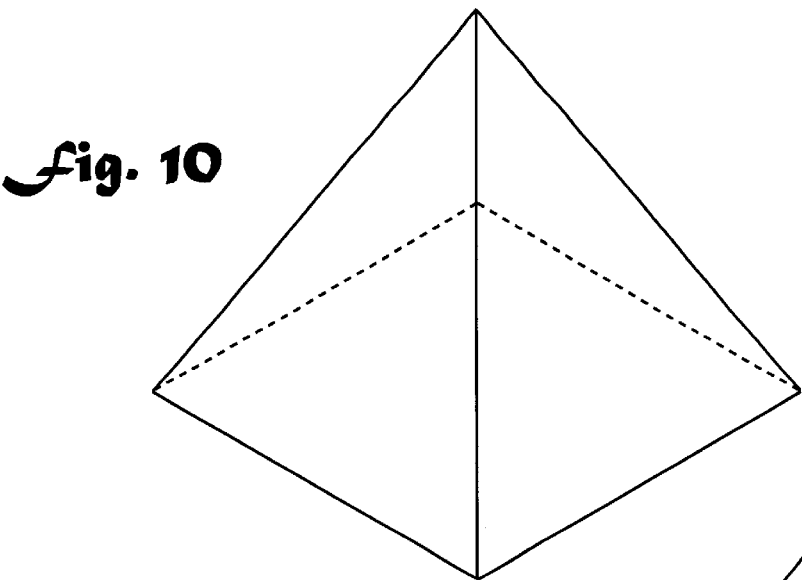
FIG. 10 is a simplified perspective view of a preferred four sided pyramid shape.
Figure 11:
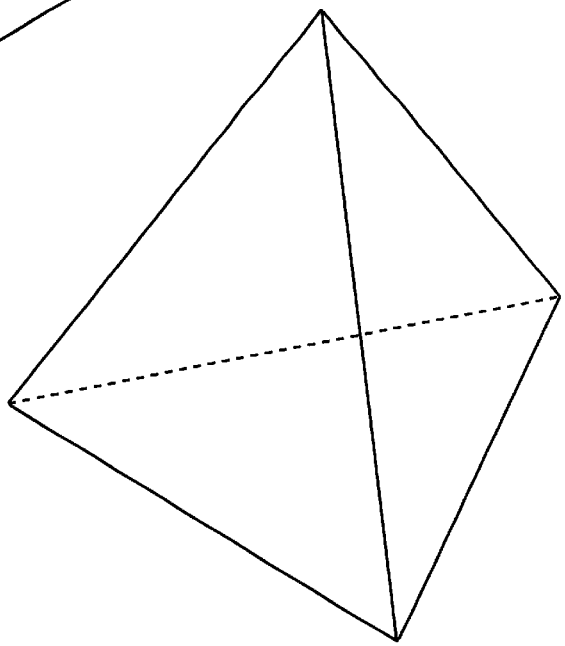
FIG. 11 is a simplified perspective view of a three sided pyramid shape.
Figure 12:
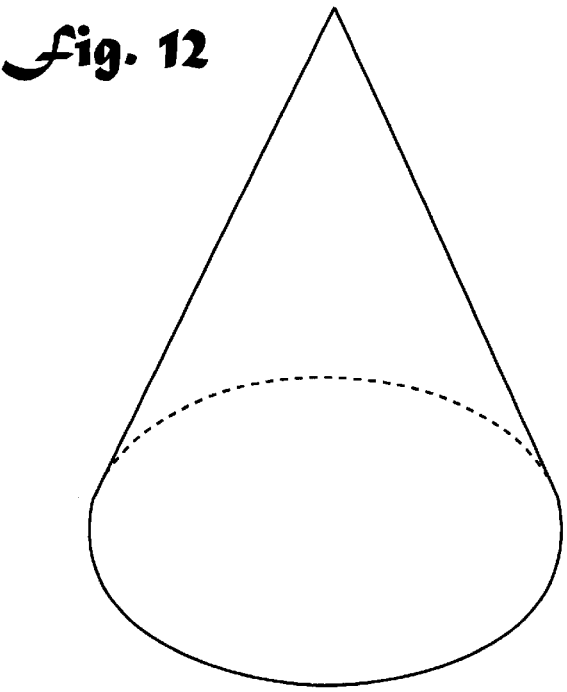
FIG. 12 is a simplified perspective view of a cone shape.

FIG. 10 is a simplified perspective view of a preferred four sided pyramid shape for a cage. FIG. 10 is a simplified perspective view of a three sided pyramid shape for a cage. And, FIG. 12 is a simplified perspective view of a cone shape for a cage. All of these shapes have inwardly and upwardly sloping sides 28, and are amenable to placement of a centrally located bird receiving structure 30. It will be appreciated that the pyramid or cone shapes could be truncated at the top where the top cannot be used by the bird.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A bird cage, comprising:

a base having a perimeter;

a plurality of inwardly sloping sides connected to said perimeter;

a bird-receiving structure substantially centrally disposed upon said base;

said bird-receiving structure having a plurality of vertically spaced perches; and, said bird-receiving structure further including a plurality of vertically spaced centrally located amenities.

2. A bird cage, comprising:

a square base;

four inwardly sloping sides connected to said base thereby forming a first four sided pyramid having an apex;

a bird-receiving structure substantially centrally disposed upon said base;

said bird cage having a removable top portion selectively connected to a bottom portion;

said top portion forming a second four sided pyramid smaller than said first four sided pyramid and having said same apex as said first four sided pyramid; and said bottom portion forming a truncated pyramid upon which said second four sided pyramid rests to form said first four sided pyramid.

3. A bird cage, comprising:

a substantially square base;

four inwardly sloping sides connected to said base, thereby forming a substantial four sided pyramid shape;

a bird-receiving structure substantially centrally disposed upon said base;

said bird-receiving structure having a plurality of vertically spaced perches; and, said bird-receiving structure further including a plurality of centrally located vertically spaced amenities.

4. A bird cage, comprising:

a substantially square base;

four inwardly sloping sides connected to said base, thereby forming a substantial four sided pyramid shape;

a bird-receiving structure substantially centrally disposed upon said base;

each of said inwardly sloping sides forming an angle of substantially between 40° and 70° with said base;

said bird cage being doorless;

said bird cage having a removable top portion selectively connected to a bottom portion;

a selectively removable perch connected to said removable top portion; and, said bird-receiving structure further including a plurality of vertically spaced perches including an uppermost perch.

* * * * *